United States Patent [19]
Bechtel et al.

[11] Patent Number: 5,662,457
[45] Date of Patent: Sep. 2, 1997

[54] HEAT INSULATION ASSEMBLY

[75] Inventors: Hans-Peter Bechtel, Ludwigshafen; Winfried Schneeberger, Ludwigshafen/Ruchheim, both of Germany

[73] Assignee: G&H Montage GmbH, Ludwigschfen, Germany

[21] Appl. No.: 458,026

[22] Filed: Jun. 1, 1995

Related U.S. Application Data

[63] Continuation of Ser. No. 218,671, Mar. 25, 1994, abandoned.

[30] Foreign Application Priority Data

Sep. 13, 1993 [DE] Germany ............ 43 31 060.5

[51] Int. Cl.⁶ .................................... F01D 25/08
[52] U.S. Cl. .......... 415/135; 415/136; 415/138; 415/176; 415/178; 29/889.2; 29/890.049; 403/28; 403/50
[58] Field of Search ............. 415/173.1, 173.2, 415/173.3, 173.5, 175, 176, 177, 178, 135, 136, 138; 165/135; 181/282; 29/889.2, 890.049; 403/28, 50

[56] References Cited

U.S. PATENT DOCUMENTS

| | | |
|---|---|---|
| 4,083,180 | 4/1978 | Thompson et al. . |
| 4,686,959 | 8/1987 | Marksberry ............ 165/18 |
| 4,925,365 | 5/1990 | Crozet et al. . |
| 5,152,666 | 10/1992 | Stripinis et al. . |
| 5,288,429 | 2/1994 | Von Bonin et al. . |

FOREIGN PATENT DOCUMENTS

| | | |
|---|---|---|
| 0 265 337 | 4/1988 | European Pat. Off. . |
| 0 515 892 | 5/1992 | European Pat. Off. . |
| 34 46 649 | 6/1986 | Germany . |
| 39 40 381 | 6/1991 | Germany . |
| 40 33 711 | 4/1992 | Germany . |
| 43 41 060 | 6/1994 | Germany . |
| 3 433 270 | 3/1996 | Germany . |
| 0 085 227 | 4/1988 | Japan . |

*Primary Examiner*—Christopher Verdier
*Attorney, Agent, or Firm*—Brinks Hofer Gilson & Lione

[57] ABSTRACT

An improved heat insulation assembly for a thermal turbo-engine having hollow spaces, is provided with the assembly including a heat-insulating material enclosed within a heat-resistant cover that is formed such that it permits an increase in the inner volume, and the heat-insulating material being a heat-insulating material which increases its volume upon heating to such an extent that the cover is expandable until contact with the inner side of a corresponding hollow space.

45 Claims, 6 Drawing Sheets

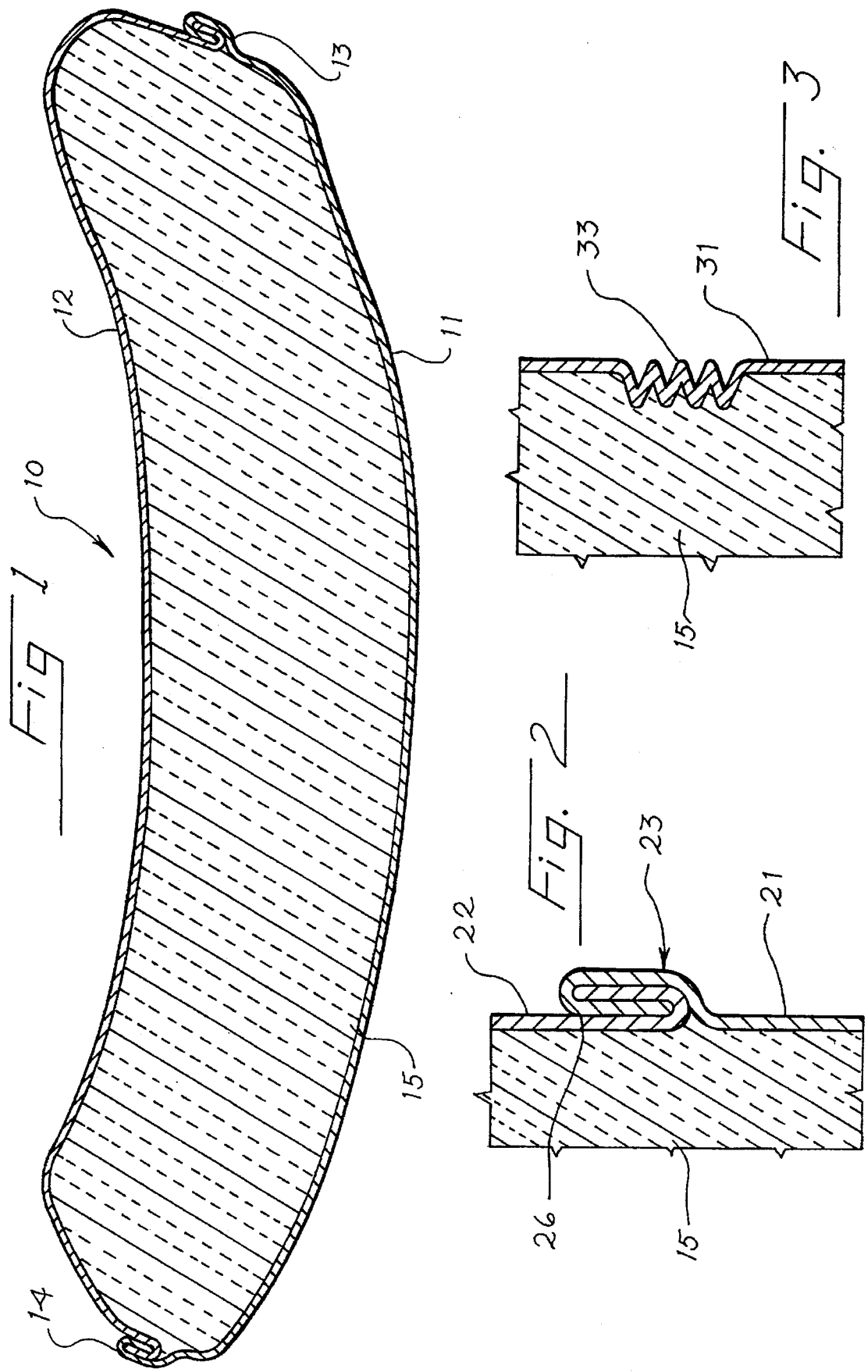

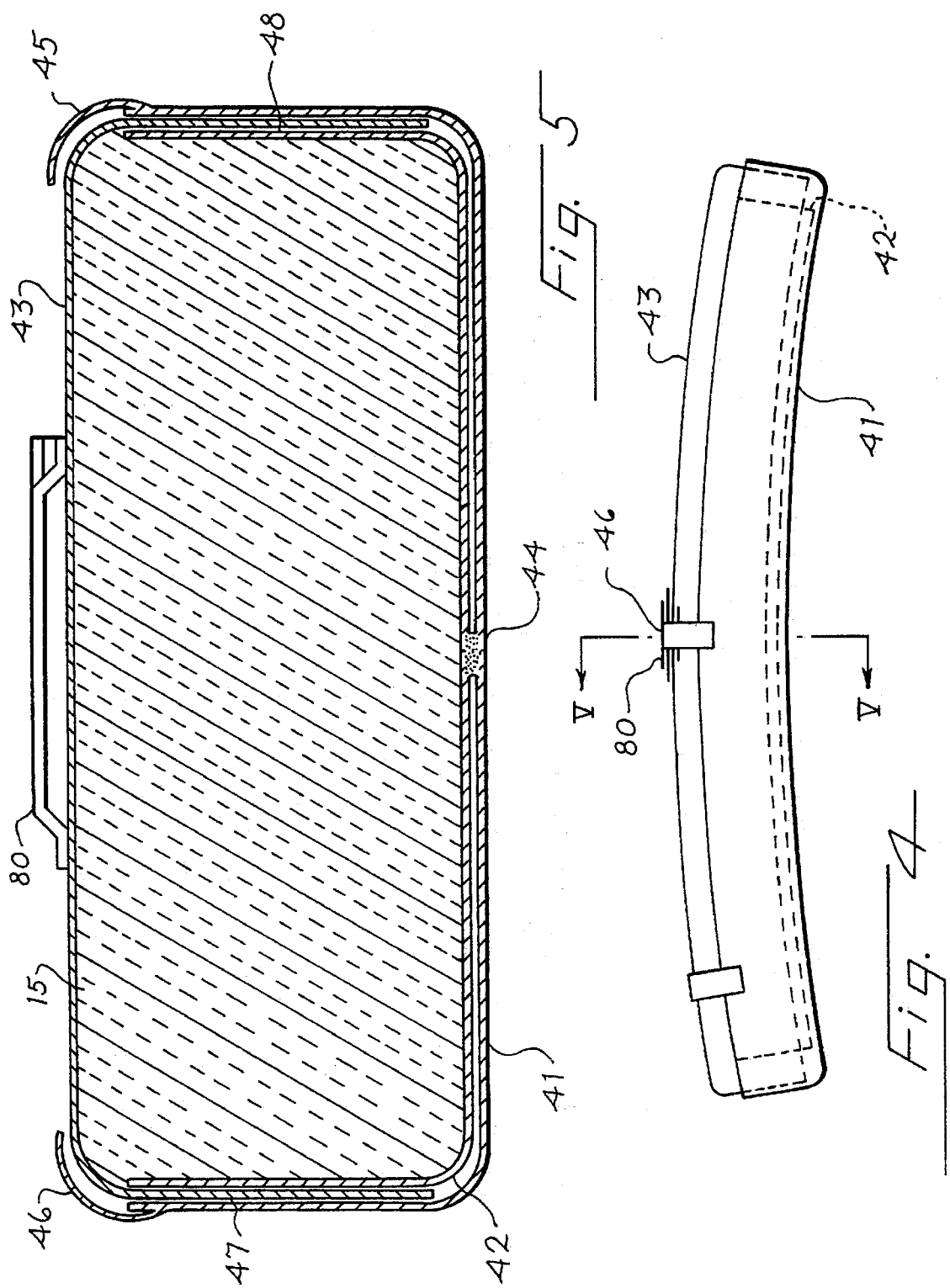

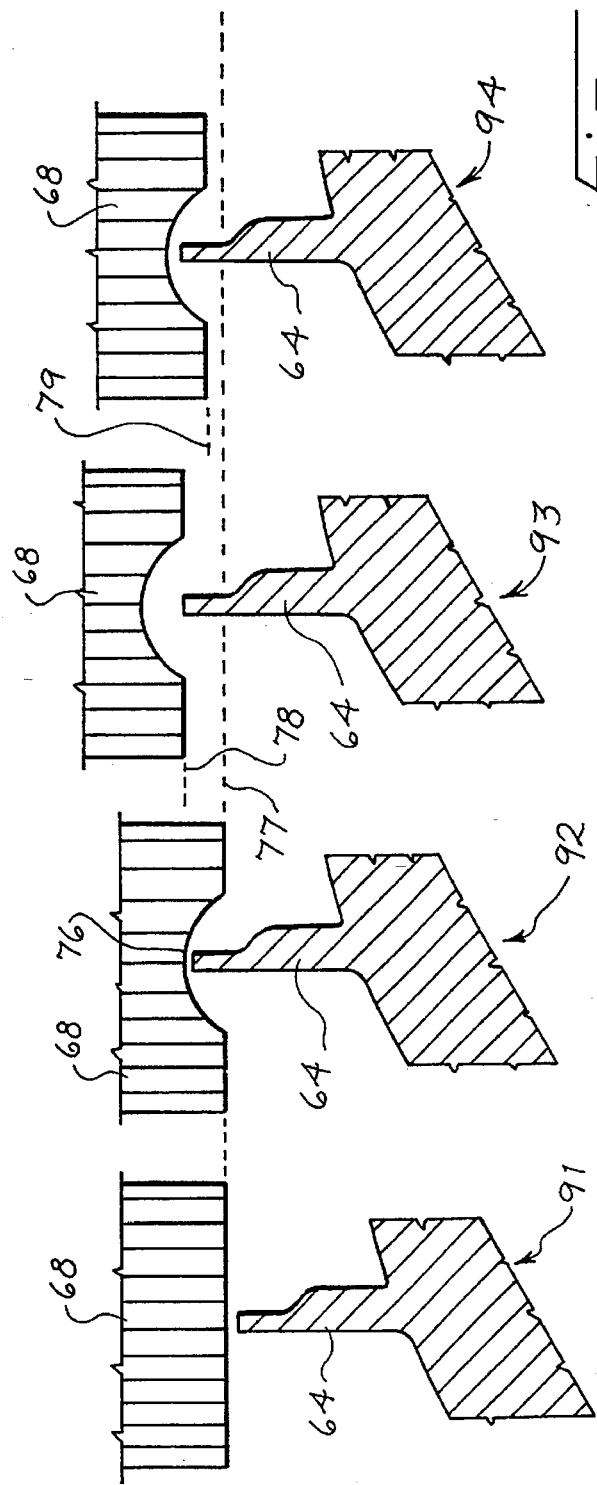
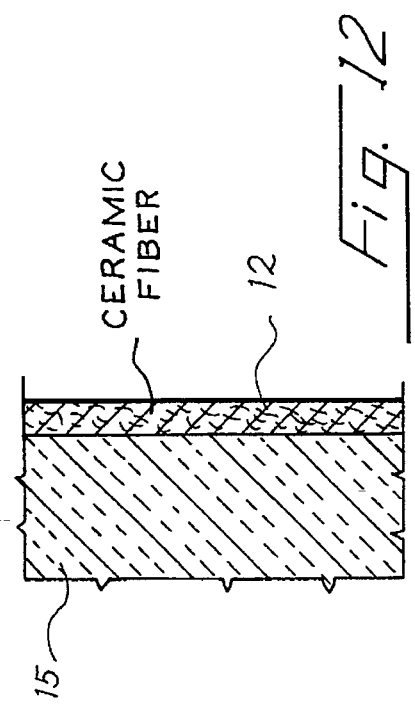
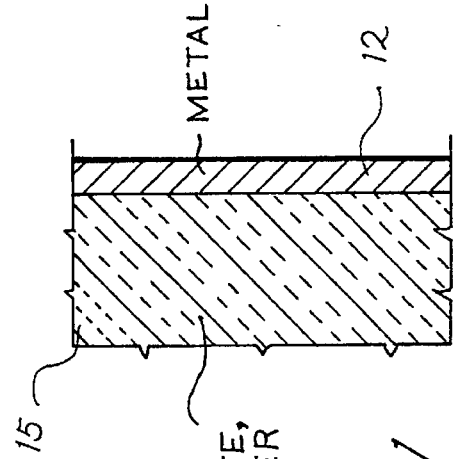

HEAT INSULATION ASSEMBLY

This application is a continuation of application Ser. No. 08/218,671, filed Mar. 25, 1994 (abandoned).

BACKGROUND OF THE INVENTION

The present invention relates to a heat insulation assembly for turbo-engines having hollow spaces and including a heat-insulating material enclosed within a heat-resistant cover.

In thermal turbo-engines, such as aircraft turbines or stationary gas turbines, a heat insulation of a housing is, e.g., needed for components arranged inside a gas compressing area, which have a high temperature due to gas compression. With an efficient thermal insulation of the housing relative to the high-temperature components of the turbo-engine, the expansion can be reduced due to the thermal expansion of the housing. In jet engines, for instance, a high thermal expansion of the housing leads to a decrease in efficiency and possibly to complete failure of the jet engine because the tightness needed for the proper operation of the jet engine is lost between the turbine blades rotating inside the jet engine and the sealing elements mounted on the housing when the housing expands radially.

In the prior art as is known from U.S. Pat. No. 49 25 365, the inner housing surfaces which are directly or indirectly exposed to the high-temperature gases in the turbine are covered with a heat insulation assembly. Known heat insulation assemblies have a heat-insulating material enclosed within a stable and temperature-resistant cover. The cover consists of two matching and dimensionally stable metal shells made in a deep-drawing process. To achieve an efficient heat insulation, the metal shells are matched to the inner housing surfaces, which have a complicated structure to permit the arrangement of high-temperature resistant thermal shields, sealing elements and stationary turbine blades. The hollow spaces or recesses formed on the housing wall are, however, not entirely filled because of manufacturing tolerances for the heat insulation elements or, e.g., because of the complicated shape of the hollow spaces, so that there remain free gas-filled spaces in which a heat conduction circumventing the heat insulation is created by heat convection. As a consequence, the heat insulation cannot be optimum, so that the housing has a comparatively high temperature during operation of the turbine, whereby the performance of the turbine is limited because of reduced tightness.

SUMMARY OF THE INVENTION

In view of the problems found in the prior art, it is the object of the present invention to provide an improved heat insulation assembly for turbo-engines having hollow spaces.

According to the invention the object is attained through a generic heat insulation assembly for thermal turbo-engines with hollow spaces, wherein the cover is formed such that it permits an increase in the inner volume and wherein the heat-insulating material is a heat-insulating material that increases its volume upon heating to such an extent that the cover is expandable until contact with the inner side of a corresponding hollow space.

The heat insulation assembly of the invention has the advantage that the heat insulation assembly which is inserted into the hollow spaces of the thermal turbo-engine under normal temperature and is predominantly matched to the hollow space expands upon heating, whereby free spaces and gaps that still exist between the cover and the inner wall of the hollow space are filled. The efficiency of the heat insulation assembly is thereby increased because the heat convection currents, such as gas currents flowing behind the heat insulation assembly, are avoided. Moreover, the invention saves costs due to increased manufacturing tolerances, as the heat insulation assembly clings to the complicated hollow spaces in the thermal turbo-engine due to the expansion initiated by the increase in temperature. Furthermore, the heat insulation assembly of the invention increases the possibility of a self-locking action of such a heat insulation assembly within a hollow space which is not entirely surrounded, or in a suitably shaped recess, when the heat insulation assembly expands behind projecting parts into the hollow space or recess upon heating. Costs are further saved by the improved heat insulation characteristics of such a heat insulation assembly because the demands made on the heat resistance of the materials used are reduced on account of the decreased temperature, which permits the use of less expensive materials. On the other hand, the improved heat insulation creates possibilities regarding new designs for turbo-engines or the increased performance of known engines.

In an advantageous embodiment the cover includes at least two partial surfaces whose superimposed edge portions are crimped to establish a connection which can be expanded when the volume of the heat-insulating material is increased. Especially when a metal foil is used for the cover, such a fold connection turns out to be advantageous to the easy creation of a connection of the two partial surfaces, with the connection permitting an increase in the inner volume of the cover. When the heat insulation device is heated with a resultant increase in volume of the heat-insulating material, the connection formed by the dimensional stability of the metal foil is expanded by the inner pressure exerted. Such a connection of the two partial surfaces of the cover for forming a thermoautomatic seam avoids troublesome working processes, such as soldering or welding, and additionally excludes the use of adhesives which are not desired in turbo-engines.

In another advantageous embodiment, the heat insulation material has an irreversible expansion upon heating from an initial temperature to a deformation temperature. A heat insulation assembly inserted into a hollow space is therefore adapted in a homogeneous and permanent manner to the hollow space after such a heating process. Especially in the case of a self-locking of the heat insulation assembly in a recess, such an embodiment is advantageous because the heat insulation assembly is even retained upon cooling to a normal temperature.

In another advantageous embodiment the heat insulation assembly includes pressure compensating devices which comprise, for instance, an opening which is provided in the cover and is surrounded with at least one layer of microwire fabric and a covering foil member. A pressure compensation in the heat insulation assembly is possible by means of the pressure compensating devices in case there are great changes in temperature, for instance, when the thermal turbo-engine is put into operation. The microwire fabric which is arranged above the opening, as well as the covering foil member prevent the heat-insulating material from exiting from the cover if there is a rapid change in pressure.

The heat insulation assembly of the invention is advantageously used for the heat-insulating filling of a hollow space existing in a housing wall of an aeronautical gas turbine. The increased thermal insulation between a gas compression area of the aeronautical gas turbine and a housing wall effects a reduced radial expansion of the housing, resulting in increased tightness between the rotating turbine blades and sealing elements stationarily mounted on the housing. An aeronautical gas turbine equipped in this way exhibits increased performance and is less prone to failure due to the improved sealing power.

This invention is also directed to a method for insulating a housing in a gas turbine engine, wherein the housing surrounds a turbine rotor. The method of this invention comprises the steps of providing a heat insulation assembly comprising a heat insulating material which expands when heated and a cover configured to accommodate said expansion of said heat insulating material. The expandable heat insulation assembly is then placed in a hollow space within the housing, and the engine is operated to heat the housing to a temperature sufficient to expand the heat insulating material until the cover contacts an inner wall of the space. Preferably, this expansion can include expanding the heat insulating material in a substantially axial direction relative to the housing.

Other advantageous embodiments will become apparent from the subclaims.

BRIEF DESCRIPTION OF THE DRAWINGS

The invention shall now be explained and described in more detail with reference to embodiments illustrated in the drawings, in which:

FIG. 1 is a cross-sectional view of an inventive embodiment of the heat insulation assembly;

FIG. 2 is an enlarged view of a detail of a connecting fold of two partial surfaces of a cover of the heat insulation assembly of FIG. 1;

FIG. 3 is an enlarged view of expansion folds formed in the cover according to another embodiment;

FIG. 4 is a view of another embodiment of the heat insulation assembly with a double-walled cover member;

FIG. 5 is a cross-sectional view taken along line V—V of the embodiment shown in FIG. 4;

FIG. 10 diagrammatically illustrates the hollowing of sealing elements by opposite sealing tips of the rotating blades at different times of the temperature curve illustrated in FIG. 9.

FIGS. 11 and 12 are fragmentary cross-sectional representations of portions of heat insulation assemblies using alternative materials.

DESCRIPTION OF THE PREFERRED EMBODIMENTS

Figure 6:
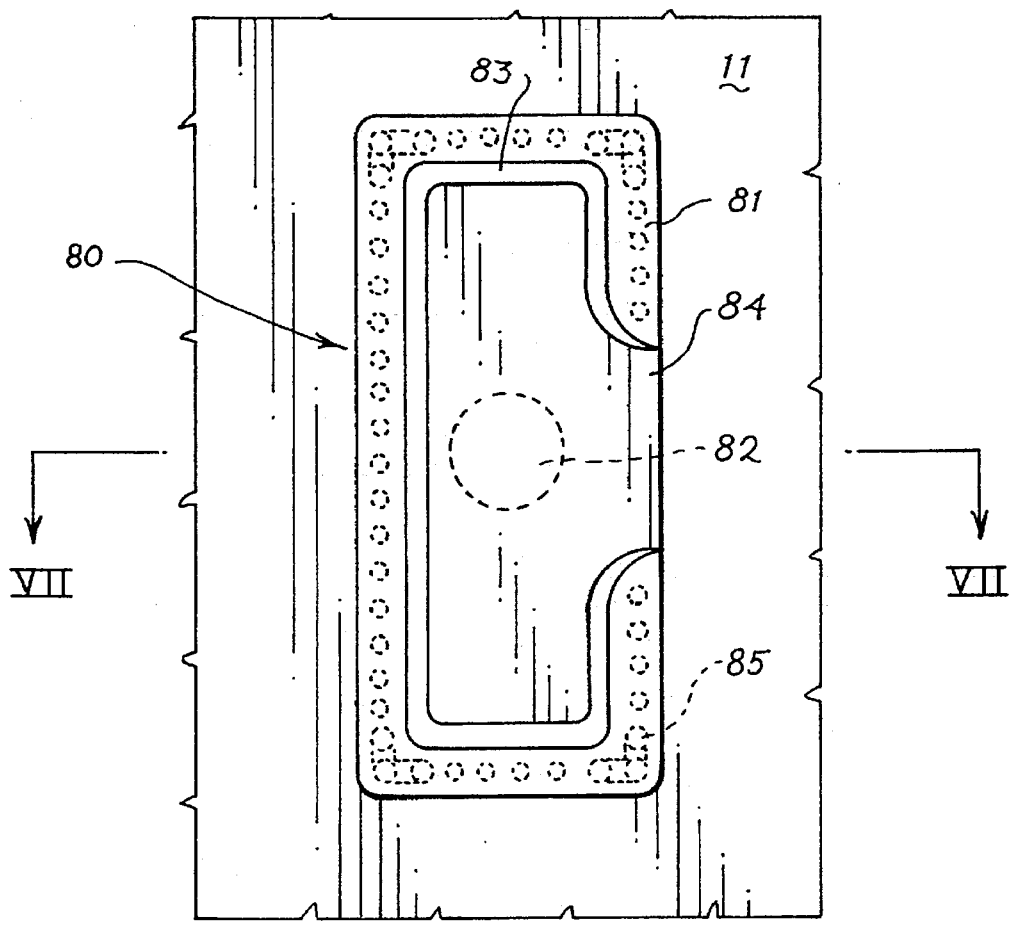
FIG. 6 is a top view on a pressure compensating device.

FIG. 1 is a cross-sectional view of an embodiment of a heat insulation assembly 10 according to the invention. A cover consisting of two partial surfaces 11 and 12 encloses a heat-insulating material 15. The cover has a shape typically matched to a respective hollow space into which the heat insulation assembly is to be inserted. Expandable connections 13 and 14 are created on the lateral end portions of the heat insulation assembly by crimping the superimposed edge portions of the two border surfaces 11 and 12. The cover consists of a metal foil which is resistant to high temperatures (FIG. 11). For instance, a foil which has a thickess of about 20 μm and consists of a nickel-containing steel, such as Inconel 600, is suited for the cover. Other metals and different foil thicknesses may also be used. For instance, a cover of a temperature-resistant ceramic fiber tissue may be used (FIG. 12).

The heat-insulating material may consist of a composite mixture of non-expanded alumina-silicate ceramic-fiber vermiculite and an organic binder system (FIG. 11). In an embodiment it contains vermiculite in an amount of from 45 to 62.5%, alumina-silicate in an amount of from 27.5 to 45% and an acrylic resin in an amount of from 6 to 13%.

Another embodiment of the heat-insulating material comprises the following substances: 54.0% $NiO_2$, 23.0% $Al_2O_3$, 0.5% $TiO_2$, 3.5% $Fe_2O_3$, 1.0% CaO, 14.0% MgO, 3.0% $K_2O$. A heat-insulating material of such an embodiment has a volume weight of 0.63 $g/cm^3$, a high-temperature loss of 15% weight perecent at 900°, a strength of more than 100 kPa, a pressure resistance of up to 4,800 kPa at a thickness of 2.3 nun, a thermal conductivity of 0.10 W/mK at 700° C. and a thermal conductivity of 0.13 W/mK at 900° C.

High temperatures inflate or expand the heat-insulating material to up to 300% of its initial thickness. The expansion process begins at a thermal action of about 350° C. and the maximum expansion can be observed at about 700° C.

FIG. 2 is an enlarged view of a special embodiment of connecting the two partial surfaces 11 and 12 that form the cover. The superimposed edge portions of the partial surfaces 11 and 12 are crimped on a fold 26 to create a connection 23 that is expandable by exerting a pulling force on the partial surfaces 21 and 22. This embodiment of a connection of the partial surfaces 21 and 22 turns out to be of advantage, especially when a metal foil is used, as the elastic form strength of the metal foil effects a reliable connection which is nevertheless expandable by applying small pulling forces along the partial surfaces 21 and 22.

Another embodiment that is illustrated in FIG. 3 and shows expansion folds 33 arranged in cover 31 also turns out to be of special advantage when a cover of metal is used. The use of expansion folds 33 in cover 31 permits an increase in volume of the cover when the enclosed heat-insulating material 15 blows up, especially in the case of metal foils of increased thickness that have an increased elastic form strength.

FIG. 4 illustrates another embodiment of the heat insulation assembly wherein part of the cover, which is positioned at the bottom in the drawing, is double-walled including an outer jacket 41 and an inner jacket 42 (shown in broken line in the drawing). An upper jacket surface is inserted into the gap formed between the inner jacket 42 and the outer jacket 41.

FIG. 5, which is a cross-sectional view taken along line V—V shows a connection 44 between the outer jacket 41 and the inner jacket 42. Such a connection may, for instance, be a spot-welded joint. Holding clasps 45 and 46 which are bent around the upper jacket surface 43 for preventing the inserted portions 47 and 48 of the upper jacket surface from exiting from the gap of the double-walled lower cover are provided on the lateral edge of the outer jacket 41.

When a ceramic fiber tissue is used as a cover, the inner volume of the cover may for instance be increased by the expansibility of the tissue structure.

Figure 7:
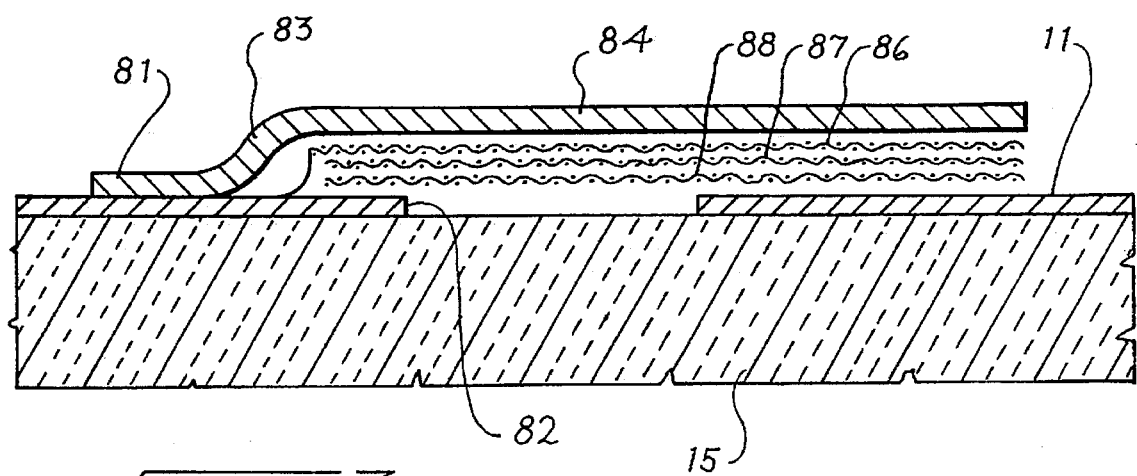
FIG. 7 is an enlarged cross-sectional view taken along line VII—VII of the pressure compensating device shown in FIG. 6.

A pressure compensating device 80 for the heat insulation assembly 10 is shown in FIG. 6. An enlarged cross-sectional view which is taken along the sectional line VII—VII in FIG. 6 is shown in FIG. 7, the direction perpendicular to the surface of cover 11 being illustrated in superproportionally enlarged fashion in said cross-sectional view. The pressure compensating device 80 includes an opening 82 in cover 11 of a circular shape in the present embodiment. Three microwire fabrics 86, 87 and 88 that overlap cover 11 are arranged above opening 82 at the side of cover 11 which is opposite to the heat-insulating material 15. The microwire fabrics have a substantially rectangular basic shape. The microwire fabrics are arranged between cover 11 and a covering foil member 81 which has also a rectangular shape of increased width and length. The covering foil member 81 has a raised inner portion 84 which substantially corresponds to the size of the microwire fabrics 86, 87, 88. A flank portion 83 is provided between the raised portion 84 and an outer portion of the covering foil member 81 which is fastened to cover 11 by way of spot weldings 85. The raised portion 84 is extended in a partial area up to a longitudinal edge of the rectangular covering foil member 81 such that a channel is formed in said partial area between the covering foil member 81 and cover 11. A gas exchange may take place through the channel via opening 82 in cover 11 through the microwire grids. The pressure compensating device 80 ensures an effective pressure compensation in case of an increase in temperature so as to prevent the cover from cracking due to an overpressure exerted by gas within the heat-insulating material. Moreover, upon escape of the organic binder an exit opening is created for the resultant carbon dioxide and water vapor. Upon cooling of the heat insulation assembly any shrinkage of the heat insulation assembly is prevented by gas flowing subsequently from the surroundings into the heat-insulating material.

The microwire fabrics 86, 87 and 88 prevent the entry of foreign particles and the discharge of heat-insulating material, which is to be avoided in a gas turbine when the heat-insulating device is used. The covering foil member 81 consists in this embodiment of the same material as cover 11, i.e., for instance, of Inconel 600.

Figure 8:
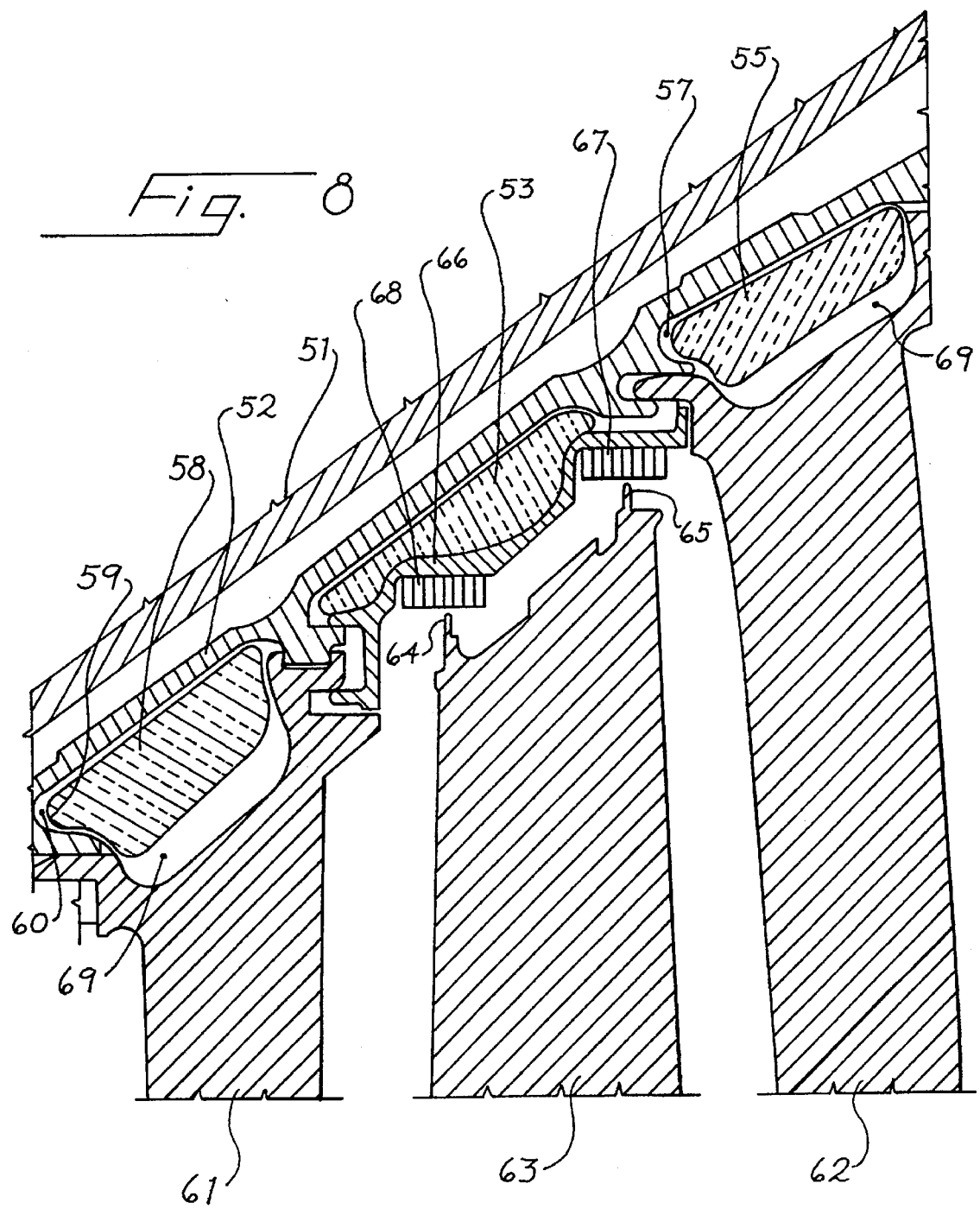
FIG. 8 is an axial cross-sectional view through an edge portion of an aeronautical gas turbine engine in which the heat insulation assembly of the invention is used in hollow spaces in a housing wall.

The heat insulation assembly according to the invention can advantageously be used in the manufacture of gas turbines for aircrafts. An edge portion of an aeronautical gas turbine is partly shown in FIG. 8 in an axial cross-sectional view. An outer housing of the aeronautical gas turbine which consists of two layers 51 and 52 comprises hollow spaces 69 into which the heat insulation assemblies 53, 55, 58 according to the invention are inserted with a shape substantially matched to the hollow spaces. The hollow spaces 69 are formed by recesses in the second housing wall layer 52, with the recesses being covered either by a base member of a stationary turbine blade 61 or 62 or by a thermal shield 66.

Instead of the thermal shield 66, the heat insulation assembly may be provided at the side facing the hot gas with a suitably formed insulation jacket which takes over the functions of the thermal shield.

Sealing elements 68 and 67 which are opposite to sealing tips 64, 65 that are mounted on a rotating blade 63 which is secured to a rotatable turbine shaft (not shown in the drawing) are arranged on the thermal shield 66. The sealing elements may, e.g., have a honeycombed structure. The heat-insulating devices 53, 55 and 58 partly fill the hollow spaces 69 after assembly, especially leaving gaps and free spaces 57 and 60 which permit the flow of hot gas behind the heat-insulating elements 55 and 58. To avoid convection-type heat conduction caused by the backflow of hot gases in said gaps, which considerably reduces the heat-insulating property, an expansion of the heat-insulating elements 53, 55 and 58 is effected by heating in substantially lateral (axial) direction up to the stop on the inner walls of the hollow spaces 69, whereby the free spaces 60 and 57 can be filled. This prevents hot gases from flowing behind the heat insulation assemblies 55 and 58.

Figure 9:
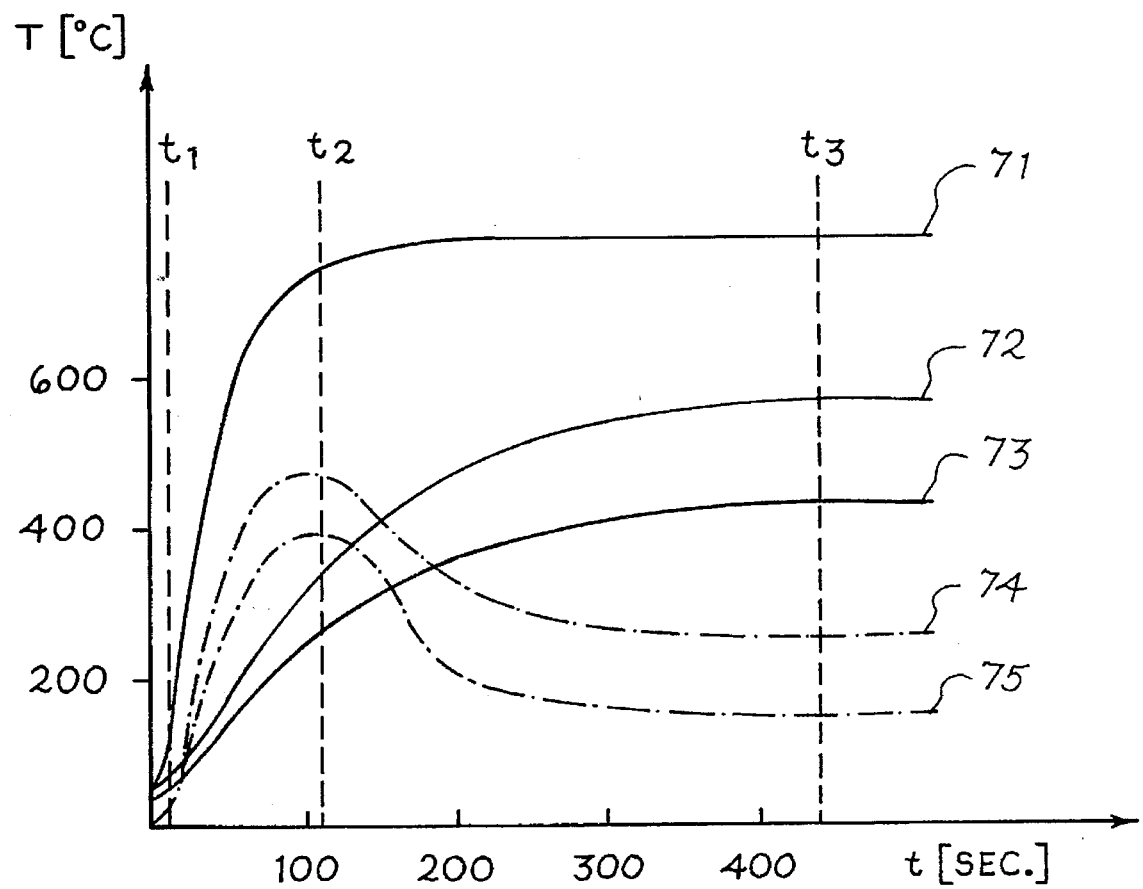
FIG. 9 is a graphic representation of the temperature characteristics of parts of the aeronautical gas turbine housing with and without use of the heat insulation assembly of the invention when the engine is started.

A graphic representation of the temperature curves during start of the areonautical gas turbine is given in FIG. 9 for illustrating the essential importance of the thermal insulation of the housing of an aeronautical gas turbine relative to a high-temperature area in a gas compressor of the turbine. The temperature characteristics are to be explained symptomatically by reference to the illustrated curves. In the diagram of FIG. 9, 71 stands for a temperature curve of the rotating blades 63, 72 for a temperature curve of the housing layer 51 in a conventional heat insulation, and 73 for a temperature curve of the housing layer 51 when the heat insulation assembly of the invention is used. In the diagram, time marks 61 are shown at the beginning of the starting process, t2 during the maximum rise of the housing temperature and t3 near the state of equilibrium- One can see in the area of time mark t3 that temperature 71 of the rotating blade 63 is substantially higher than temperatures 72 or 73 of the housing layer 51 which is thermally insulated in a conventional way or according to the invention. The temperature difference may amount to several hundred degrees. Furthermore, the housing temperature 73 of the heat insulation assembly of the invention is up to 200° below the housing temperature 72 in the conventional heat insulation. Another essential feature of the heating characteristics of the aeronautical gas turbine is illustrated in the area of time mark t2. Temperature 71 of the rotating blade 63 approaches its equilibrium value after a considerably shorter period of time than does temperature 72 or 73 of the housing layer 51 which is thermally insulated in a conventional way or according to the invention. This temporarily yields a maximum temperature difference between the rotating blade 63 and the housing in the area of time mark t2, as is illustrated by the dash-dotted curves 74 and 75 for the temperature difference in the case of the heat insulation according to the invention and a conventional heat insulation.

FIG. 10 illustrates, by way of the sequential representations 91, 92, 93 and 94, the mutual position of sealing tips 64 on the rotating blade 63 relative to the honeycombed sealing element 68 in the states of the radial expansion of the aeronautical gas turbine, which states correspond to time marks t1, t2 and t3. In the illustration 91, both the housing and the rotating blade 63 have their initial temperatures, so that the sealing tip 64 has a small distance from sealing element 68, which distance is due to mounting. During the starting process, the rotating blade 63 is first heated and then expands radially, whereby a notch 76 is milled into sealing element 68 by the rotating sealing tip 64. Since both a radial thermal expansion and an axial thermal expansion exist, the milled notch 76 has an annular shape. The radial expansion of the housing is first neglected in illustration 92 to represent the effect of the notch of sealing element 68 more clearly.

Illustrations 93 and 94 show the mutual position of the sealing tip 64 relative to sealing element 68 for a conventional heat insulation assembly, which results in an increased temperature 72, and for a heat insulation assembly of the invention, which yields a lower temperature 73. As becomes apparent from illustration 93, the higher housing temperature 72 obtained because of the reduced heat insulation in a conventional heat insulation device leads to a higher radial thermal expansion of the housing, which effects a displacement of the sealing surface of the sealing element 68 from an original level 77 to a level 78. As shown in illustration 94, a reduced radial thermal expansion of the housing is achieved with the improved heat insulation, so that the sealing surface of the sealing element 68 secured to the housing moves to a level 79 which has a smaller distance from the initial level 77 than level 78. As becomes obvious from a comparison of illustrations 93 and 94, the sealing device in the aeronautical gas turbine has a gap which, when the heat insulation assembly of the invention is used, is considerably reduced in the area of time mark t3 in comparison with the use of a conventional insulation device. The operational characteristics of the aeronautical gas turbine are improved due to the reduction of this gap. The heat insulation assembly of the invention is therefore preferably used in the manufacture of aeronautical gas turbines whose performance can be increased by improved heat insulation characteristics.

The use of the heat insulation assembly according to the invention turns out to be of advantage to stationary gas turbines as well. The heat insulation assembly is normally used in thermal turbo-engines in which specific device parts must be kept at different temperature levels. As a result of the improved heat insulation, which is obtained with the heat insulation assembly according to the invention, the thermal turbo-engines can be operated with improved efficiency on the one hand and the device parts that exhibit a reduced temperature level can be replaced by inexpensive materials with small temperature demands on the other hand.

We claim:

1. In a turbine engine including a housing surrounding a turbine rotor wherein a plurality of spaces are defined within said housing and said spaces each have an inner wall, the improvement comprising:
   a) a thermal insulation assembly disposed in at least one of said spaces, said thermal insulation assembly comprising a cover formed of heat resistant material, and heat insulating material within said cover;
   b) said heat insulating material being expanded in-situ within said space by heat generated to cause said heat insulation assembly to expand into contact with said inner wall of said space.

2. The improvement in a turbine engine of claim 1 wherein:
   a) said engine is an aeronautical gas turbine engine and said space is created by a recess formed on the inside of said housing and covered by a thermal shield.

3. The improvement in a turbine engine of claim 2 wherein:
   a) said thermal shield is formed by a portion of said cover positioned at the gas side of said turbine.

4. The improvement in a turbine engine of claim 3 further characterized in that:
   a) another one of said hollow spaces contains a second thermal insulation assembly;
   b) said other hollow space being formed by a recess which is arranged on the inside of said housing and is covered by a base member of a stationary and radially inwardly projecting turbine blade.

5. The improvement in a turbine engine of claim 1 further characterized in that:
   a) said cover comprises a flexible material which deforms readily when said insulating material expands.

6. The improvement in a turbine engine of claim 5 further characterized in that:
   a) said cover comprises metal foil.

7. The improvement in a turbine engine of claim 5 further characterized in that:
   a) said cover comprises a ceramic fiber tissue.

8. The improvement in a turbine engine of claim 1 further characterized in that:
   a) said cover comprises at least two partial cover surfaces having corresponding, super-imposed edge portions;
   b) said edge portions being folded together to create a connection between the cover surfaces which is capable of expanding when the volume of the heat insulating material increases.

9. The improvement in a turbine engine of claim 1 further characterized in that:
   a) the cover includes expansion folds to accommodate said expansion of the heat insulating material.

10. The improvement in a turbine engine of claim 1 further characterized in that:
    a) said cover comprises at least two partial cover surfaces having corresponding edge portions;
    b) said edge portions being arranged in overlapping fashion to create an increase in an inner volume of the cover upon said expansion of said heat insulating material.

11. The improvement in a turbine engine of claim 1 further characterized in that:
    a) said heat insulating material is irreversibly expanded when heated to a predetermined temperature.

12. The improvement in a turbine engine of claim 1 further characterized in that:
    a) said heat insulating material comprises vermiculite.

13. The improvement in a turbine engine of claim 1 further characterized in that:
    a) said heat insulating material comprises vermiculite, alumina-silicate and an organic binder.

14. The improvement in a turbine engine of claim 1 further characterized in that:
    a) said cover comprises means which permit equalization of pressure inside and outside said cover.

15. The improvement in a turbine engine of claim 14 further characterized in that:
    a) said pressure equalization means comprises an opening formed in said cover; and
    b) a filter disposed over said opening.

16. The improvement in a turbine engine of claim 15 further characterized in that:
    a) said filter comprises a layer of microwire fabric; and
    b) a foil element covering said fabric.

17. The combination of a housing and an expandable heat insulation assembly mounted in a hollow space defined within said housing, further characterized in that:
    a) said hollow space has an inner wall; and
    b) said insulation assembly includes a cover formed of heat resistant material;
    c) said cover configured to accommodate expansion of the cover to increase its inner volume; and
    d) a heat insulating material disposed within the inner volume of said cover;
    e) said insulating material, when heated to a predetermined temperature, being sufficiently expandable to cause said cover to expand into contact with said inner wall.

18. The combination of claim 17 further characterized in that:
    a) said cover comprises a flexible material which deforms readily when said insulating material expands.

19. The combination of claim 18 further characterized in that:

a) said cover comprises a metal foil.

20. The combination of claim 18 further characterized in that:
   a) said cover comprises a ceramic fiber tissue.

21. The combination of claim 17 further characterized in that:
   a) said cover comprises at least two partial cover surfaces having corresponding, super-imposed edge portions;
   b) said cover including said edge portions folded together to create a connection between the cover surfaces which is capable of expanding when the volume of the heat insulating material increases.

22. The combination of claim 17 further characterized in that:
   a) said cover includes expansion folds to accommodate said expandability of the heat insulating material.

23. The combination of claim 17 further characterized in that:
   a) said cover comprises at least two partial cover surfaces having corresponding edge portions;
   b) said edge portions being arranged in overlapping fashion to create an increase in the inner volume of said cover to accommodate said expandability of said heat insulating material.

24. The combination of claim 17 further characterized in that:
   a) said heat insulating material is irreversibly expanded when heated to said predetermined temperature.

25. The combination of claim 17 further characterized in that:
   a) said heat insulating material comprises vermiculite.

26. The combination of claim 17 further characterized in that:
   a) said heat insulating material comprised vermiculite, alumina-silicate and an organic binder.

27. The combination of claim 17 further characterized in that:
   a) said cover comprises means which permit equalization of the pressure inside and outside said cover.

28. The combination of claim 27 further characterized in that:
   a) said pressure equalization means comprises an opening formed in said cover; and
   b) a filter disposed over said opening.

29. The combination of claim 28 further characterized in that:
   a) said filter comprises a layer of microwire fabric; and
   b) a foil element covering said fabric.

30. The combination of claim 29 further characterized in that:
   a) said filter comprises multiple layers of microwire fabric over said opening, outside of said cover.

31. An expandable heat insulation assembly for mounting in a hollow space defined within a housing, comprising:
   a) a cover formed of heat resistant material, said cover configured to accommodate expansion of the cover to increase its inner volume; and
   b) a heat insulating material disposed within the inner volume of said cover;
   c) said insulating material, when heated to a predetermined temperature, being sufficiently expandable to cause said cover to expand.

32. The insulation assembly of claim 31 further characterized in that:
   a) said cover comprises a flexible material which deforms readily when said insulating material expands.

33. The insulation assembly of claim 32 further characterized in that:
   a) said cover comprises a metal foil.

34. The insulation assembly of claim 32 further characterized in that:
   a) said cover comprises a ceramic fiber tissue.

35. The insulation assembly of claim 31 further characterized in that:
   a) said cover comprises at least two partial cover surfaces having corresponding, super-imposed edge portions;
   b) said cover including said edge portions folded together to create a connection between the cover surfaces which is capable of expanding when the volume of the heat insulating material increases.

36. The insulation assembly of claim 31 further characterized in that:
   a) said cover includes expansion folds to accommodate said expandability of the heat insulating material.

37. The insulation assembly of claim 31 further characterized in that:
   a) said cover comprises at least two partial cover surfaces having corresponding edge portions;
   b) edge portions being arranged in overlapping fashion to create an increase in the inner volume of the cover to accommodate said expandability of said heat-insulating material.

38. The insulation assembly of claim 31 further characterized in that:
   a) said heat insulating material is irreversibly expanded when heated to said predetermined temperature.

39. The insulation assembly of claim 31 further characterized in that:
   a) said heat insulating material comprises vermiculite.

40. The insulation assembly of claim 31 further characterized in that:
   a) said cover comprises means which permit equalization of the pressure inside and outside said cover.

41. The insulation assembly of claim 40 further characterized in that:
   a) said pressure equalization means comprises an opening formed in said cover; and
   b) a filter disposed over said opening.

42. The insulation assembly of claim 41 further characterized in that:
   a) said filter comprises a layer of microwire fabric; and
   b) a foil element covering said fabric.

43. The insulation assembly of claim 42 further characterized in that:
   a) said filter comprises multiple layers of microwire fabric over said opening, outside of said cover.

44. A method of insulating a housing in a gas turbine engine, wherein the housing surrounds a turbine rotor, said method comprising the steps of:
   a) providing a heat insulation assembly comprising a heat insulating material which expands when heated and a cover configured to accommodate said expansion of said heat insulating material;
   b) placing said expandable heat insulation assembly in a hollow space within the housing; and
   c) operating the engine to heat the housing to a temperature sufficient to expand said heat insulating material until said cover contacts with an inner wall of said space.

45. The method of claim 44 wherein step (c) includes the step of:
   a) expanding said heating insulating material in a substantially axial direction relative to said housing.

* * * * *

UNITED STATES PATENT AND TRADEMARK OFFICE
CERTIFICATE OF CORRECTION

PATENT NO. : 5,662,457
DATED : September 2, 1997
INVENTOR(S) : Hans-Peter Bechtel et al.

It is certified that error appears in the above-identified patent and that said Letters Patent is hereby corrected as shown below:

On the Title Page

In column 2, line 7, under "FOREIGN PATENT DOCUMENTS", please change "3/1996" to --3/1986--.

In the Claims

In Claim 37, line 5, please insert --said-- before "edge".

Signed and Sealed this

Fifth Day of September, 2000

Attest:

Q. TODD DICKINSON

Attesting Officer

Director of Patents and Trademarks